(12) United States Patent
Lee et al.

(10) Patent No.: US 8,540,107 B2
(45) Date of Patent: Sep. 24, 2013

(54) COOKING VESSEL WITH NONSTICK COATING

(76) Inventors: ChangHo Lee, Guangdong (CN); SuChin Park, Busan (KR)

( * ) Notice: Subject to any disclaimer, the term of this patent is extended or adjusted under 35 U.S.C. 154(b) by 0 days.

(21) Appl. No.: 13/509,905

(22) PCT Filed: Oct. 7, 2011

(86) PCT No.: PCT/DE2011/001814
§ 371 (c)(1),
(2), (4) Date: Jul. 18, 2012

(87) PCT Pub. No.: WO2012/045306
PCT Pub. Date: Apr. 12, 2012

(65) Prior Publication Data
US 2012/0305568 A1    Dec. 6, 2012

(30) Foreign Application Priority Data
Oct. 7, 2010   (DE) ............... 20 2010 008 753 U

(51) Int. Cl.
*A47J 27/00*   (2006.01)
*A47J 36/00*   (2006.01)
*A47J 37/06*   (2006.01)
(52) U.S. Cl.
USPC .................. 220/573.2; 220/573.1; 99/372

(58) Field of Classification Search
USPC .............. 220/573.1–573.3, 912; 99/372, 99/422, 425
See application file for complete search history.

(56) References Cited

U.S. PATENT DOCUMENTS

| | | | | |
|---|---|---|---|---|
| 1,460,380 A * | 7/1923 | Hughes | ............................ | 99/425 |
| 2,618,258 A * | 11/1952 | Kroyer | ....................... | 126/390.1 |
| 3,271,653 A * | 9/1966 | Wolf | ......................... | 220/573.2 |
| 5,628,426 A * | 5/1997 | Doyle et al. | .................. | 220/608 |
| 5,809,630 A * | 9/1998 | Coissard | ......................... | 29/505 |
| 5,833,894 A * | 11/1998 | Lanzani et al. | .............. | 264/46.3 |
| 6,419,107 B1 * | 7/2002 | Cheng | ........................ | 220/573.1 |
| 7,571,530 B2 * | 8/2009 | Park | ............................... | 29/458 |
| 7,638,740 B1 * | 12/2009 | Hradecky | ..................... | 219/524 |
| 8,308,016 B2 * | 11/2012 | Ren et al. | ................... | 220/573.2 |
| 2011/0192850 A1 * | 8/2011 | Le Bris et al. | ............. | 220/573.2 |

* cited by examiner

*Primary Examiner* — Bryon Gehman
*Assistant Examiner* — Shawn Braden
(74) *Attorney, Agent, or Firm* — Andrew Wilford

(57) ABSTRACT

The invention relates to a cooking vessel having a non-stick coating, a handle and a vessel body. According to the invention, the inner surface of the vessel body is provided with a multiplicity of oil wells, the inner side of which wells is provided with studs of which the height is less than the depth of the oil wells, wherein the upper surface of the oil wells is provided with a non-stick coating, and the thickness of the non-stick coating is greater than the height of the studs and at the same time less than the depth of the oil wells.

9 Claims, 1 Drawing Sheet

COOKING VESSEL WITH NONSTICK COATING

CROSS REFERENCE TO RELATED APPLICATIONS

This application is the US-national stage of PCT application PCT/DE2011/001814 filed 7 Oct. 2011, published 12 Apr. 2012 as WO2012/045306, and claiming the priority of German patent application 202010008753.8 itself filed 7 Oct. 2010, whose entire disclosures are herewith incorporated by reference.

FIELD OF THE INVENTION

The present invention relates to a cooking vessel having a nonstick coating, in particular a pan having a nonstick coating.

BACKGROUND OF THE INVENTION

Currently, a metal saucepan or pan is normally used for frying food. An adhering or burnt coating is often formed with such conventional saucepans or pans. This not only adversely affects the appearance of the food, but also hazardous substances that are bad for the health of the consumer can be produced as a result of burnt and charred food. In addition, this also makes the saucepan or pan more difficult to clean.

For this reason, saucepans and pans with a so-called Teflon coating are normally used. The Teflon coating has a nonstick action. However, the surface coating of the saucepan or pan is often abraded during cooking and washing, for example as a result of contact with a spatula or a cleaning tool. This damages the nonstick coating, as a result of which the nonstick effect is lost. The health of the consumer can also be adversely affected as a result of the coating scrapings that can mix with the food if the scraped-off constituents are consumed with the food.

OBJECT OF THE INVENTION

Starting from this prior art, the object of the invention is therefore to provide a cooking vessel with safer and long-acting nonstick properties.

SUMMARY OF THE INVENTION

This object is attained by a cooking vessel comprising a handle and a body. The upwardly directed inner face of the body has a multiplicity of connected or disconnected oil cavities. The bottom of each oil cavities is provided with an array of small studs. The height of each small stud is less than the depth of the oil cavities. Furthermore, a uniform nonstick coating is provided on the bottom of the oil cavities. The thickness of the nonstick coating is greater than the height of the small studs and at the same time less than the depth of the oil cavities.

The advantageous effect of the present invention is as follows: As a multiplicity of disconnected or connected oil cavities is arranged on the inner face of the body, the cooking oil in the oil cavities is heated in the saucepan to its boiling point. The food floats easily as a result of the lifting of the boiling cooking oil and its distribution, so that the food does not directly touch the bottom of the pan. Furthermore, the bottom of the oil cavities is uniformly provided with a plurality of small studs whose use effectively reinforces and ensures the adhesion of the nonstick coating, so that, even after the pan has been in use for a long time, the nonstick coating does not peel off, which can be caused by the degradation due to the contact between a spatula or cleaning tool and the pan, thus achieving the objective of safety in use.

BRIEF DESCRIPTION OF THE DRAWING

Further advantages and characteristics of the invention can be seen from the following description in which embodiments of the invention are described in detail with reference to the drawing. Therein.

DETAILED DESCRIPTION OF THE INVENTION

Figure 1:
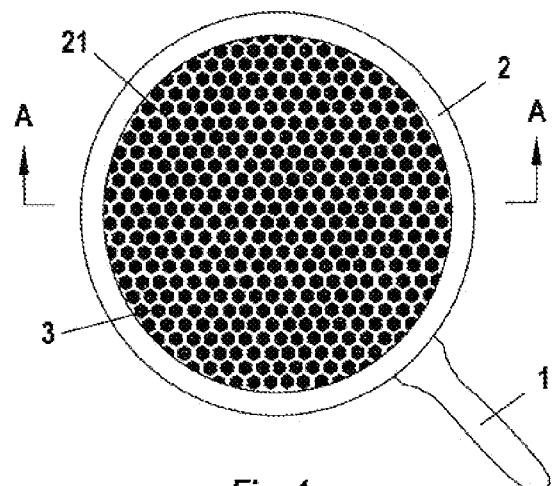
FIG. 1 is a plan view of an embodiment of the present invention.
Figure 2:
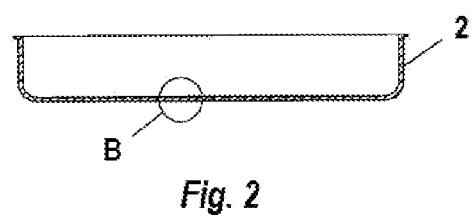
FIG. 2 is a cross section taken along section line A-A of FIG. 1.
Figure 3:
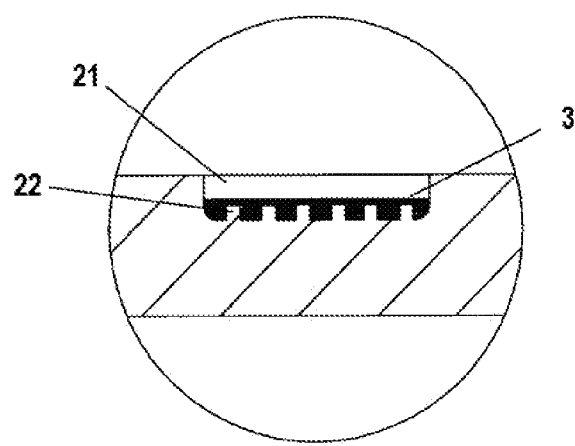
FIG. 3 is an enlarged view of the region B from FIG. 2.

The invention is explained in more detail below with reference to a pan having a nonstick coating. FIGS. 1, 2, and 3 show that the pan has a handle 1 and a body 2. The upwardly directed inner face of the body 2 is provided with a multiplicity of connected or disconnected oil cavities 21 that are uniformly distributed over this inner face. As can be seen in FIG. 1, the above-described oil cavities 21 can be of a hexagonal, round, square, polygonal or any other shape. The floors of the oil cavities 21 are each provided with a respective uniform array of small studs that can be connected or disconnected with one another. The studs 22 can be cylindrical or in the form of columns of square section. The oil cavities 21 and the small studs can also be formed and arranged differently if required.

The height of the above-mentioned small studs 22 is less than the depth of the oil cavities 21. The depth of the above-described oil cavities 21 lies between approximately 0.1 mm and 0.3 mm.

A nonstick coating 3 is formed on the bottom or on the inside of the oil cavities 21. The nonstick coating 3 can be produced from polytetrafluoroethylene (="Teflon"). The thickness of this nonstick coating 3 is up to 0.1 mm. The thickness of the nonstick coating 3 is at least 0.05 mm less than the depth of the oil cavities 21, but the thickness of the nonstick coating 3 is greater than the height of the small studs 22 and at the same time less than the depth of the oil cavities 21.

In order to improve the nonstick action, the oil cavities 21 cover more than 70% of the inner face of the body 2 or at least the floor face of the body 2. In addition, a spacing between adjacent oil cavities is less than 1 mm.

As a multiplicity of disconnected or connected oil cavities 21 is provided on the inner surface of the body 2, the cooking oil that is stored in the oil cavities 21 is heated in the saucepan to its boiling point. The food floats easily as a result of the lifting of the boiling cooking oil and its distribution, so that the food does not directly touch the floor face of the pan. Furthermore, the floors of the oil cavities 21 are each provided with a uniform array of small studs 22, whose use effectively reinforces and ensures the adhesion of the nonstick coating 3, so that, even after the pan has been in use for a long time, the nonstick coating 3 does not peel off, which can be caused by the abrasion due to the contact between a spatula or cleaning tool and the pan, thus achieving the objective of safety in use.

The invention has been described here using a pan as an example. However, the invention can also be applied to other cooking vessels that are used for cooking, in particular frying, braising or steaming.

The invention claimed is:

1. A cooking vessel comprising:

an upwardly concave body having a floor with an upwardly directed substantially planar face formed with an array of upwardly open cavities each having a base surface and each of a predetermined depth;

a handle projecting laterally from the body;

respective arrays of horizontally spaced studs formed on and projecting upward from the base surfaces of the cavities, each stud being of a predetermined height that is less than the predetermined depth; and respective layers of a nonstick coating on the base surfaces of the cavities and each of a thickness greater than the height of the studs and less than the depth of the cavities such that the studs are wholly imbedded in the respective nonstick layer and an upper surface of each of the layers is recessed below a plane of the floor between the cavities.

2. The cooking vessel defined in claim 1, wherein the depth is at least 0.1 mm and upper surfaces of the layers are at least 0.05 mm below the plane of the floor between the cavities.

3. The cooking vessel defined in claim 2, wherein a spacing between the cavities is less than 1 mm.

4. The cooking vessel as claimed in claim 1, wherein the cavities are of hexagonal, round, square or polygonal shape.

5. The cooking vessel as claimed in claim 1, wherein the studs are cylindrical or of rectangular section.

6. The cooking vessel as claimed in claim 1, wherein the cavities cover more than 70% of the upwardly directed inner planar face of the body.

7. The cooking vessel as claimed in claim 1, wherein the depth of the cavities is between 0.1 mm and 0.3 mm.

8. The cooking vessel as claimed in claim 1, wherein the thickness of the nonstick coating is up to 0.1 mm.

9. The cooking vessel as claimed in claim 1, wherein the thickness of the nonstick coating is at least 0.05 mm less than the depth of the cavities.

* * * * *